United States Patent Office 2,890,401
Patented June 9, 1959

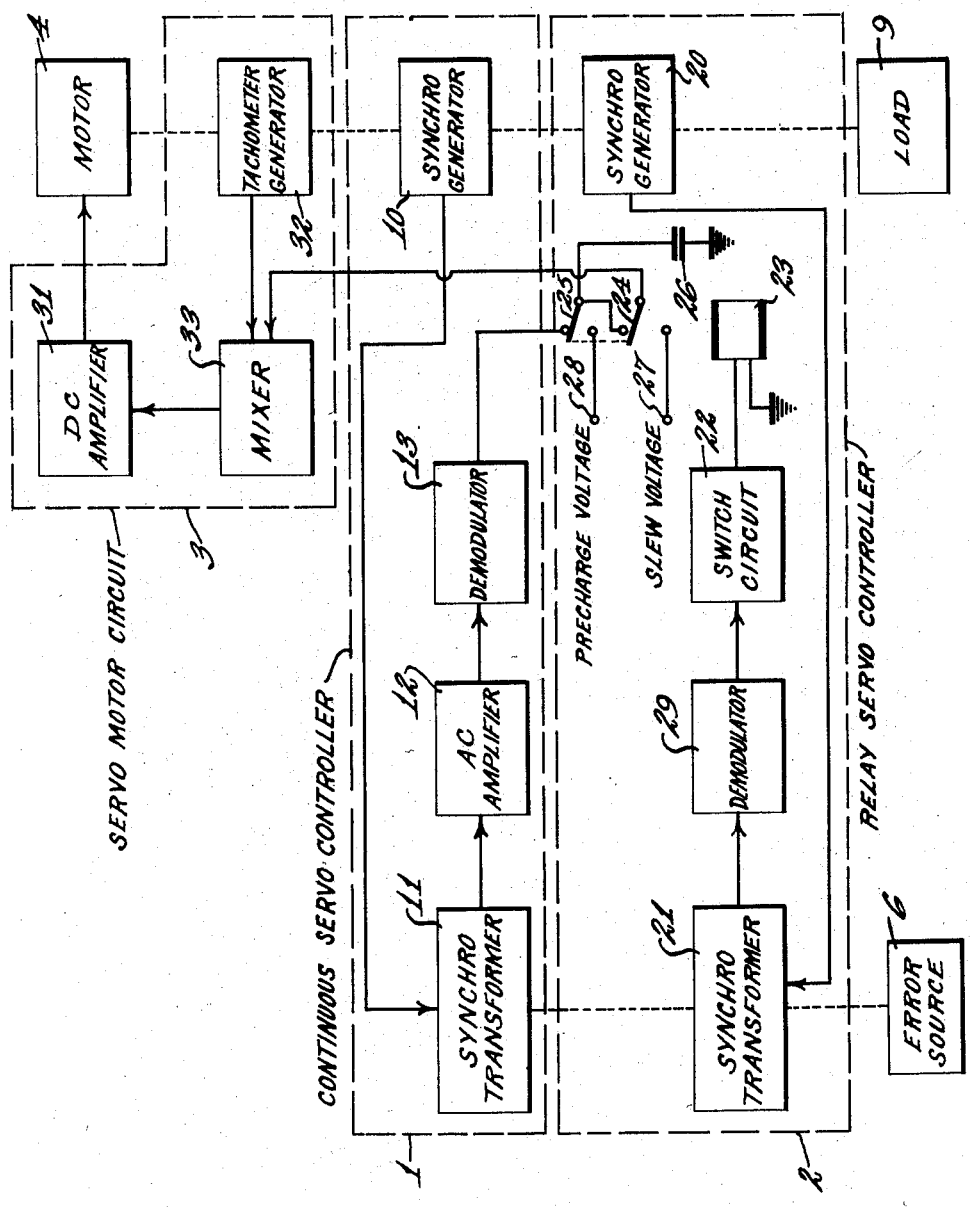

2,890,401

SERVO SYSTEM

George H. Stevens, Camden, N.J., and Oscar Wilsker, Philadelphia, Pa., assignors, by mesne assignments, to the United States of America as represented by the Secretary of the Navy Application January 31, 1958, Serial No. 712,596

3 Claims. (Cl. 318—270)

The present invention relates generally to improved servo-control systems, and particularly to improved servo-positioning systems useful in radar equipment.

It is desirable that a servo-control system respond to large error signals at the maximum speed of the servo-motor, and also respond to smaller error signals with the known accuracy to such signals of a continuous control servo-system. Such a system is especially useful in positioning radar equipment. When the target is first detected, a large error signal may be received. This causes a large error displacement to operate the servo-positioning system of the radar equipment. This error displacement must be reduced at a maximum speed until the radar antenna is approximately positioned. Then, small error displacements must be used to track the target continuously and accurately.

Some previous servo-systems attenuate the larger error signals to reduce overshoot or hunting, and therefore reduce time of response, as in continuous-control servo-mechanisms; or else, as in relay servo-mechanisms, they obtain faster response to larger error signals at a sacrifice of sensitivity to the smaller error signals.

A relay servo-mechanism, as used herein, is one in which the full power of the servo-motor is applied as soon as the error signal becomes greater than a predetermined value, and no power is applied for error signals less than that value. In such a servo-system, the inertia of the system when it is operating at maximum speed as a relay servo-mechanism presents a problem. Various methods of overcoming this inertia have been tried, such as using maximum acceleration for half the time of response, and maximum deceleration for the other half. However, this leads to very complicated criteria for switching from one mode of operation to another, and complicated circuitry to control the system.

A continuous-control servo-mechanism, as used herein, is one in which the power of the servo-motor is controlled continuously by some function of the error signal.

A general object of this invention is to provide an improved control servo-system.

Another object is to provide an improved control servo-system which will respond to a smaller error signal as a continuous-control servo-system, thus offering continuous correction or tracking of such small error signals, and will also respond to a larger error signal in such a way as to reduce the error at the maximum speed of its servo-motor.

A still further object is to provide such an improved servo-system with such response to large and small error signals that will switch quickly from maximum correction speed in response to a large error signal to response as a continuous-control system when such a large error signal decreases below a predetermined magnitude, so that the system will not overshoot or hunt the position of zero error because of the rotational inertia built up by the servo-motor at maximum correction speed.

The foregoing objects can be accomplished in accordance with the invention by an improved control servo-system which is a combination of a continuous-control servo-mechanism and a relay servo-mechanism. For error signals less than a predetermined value the system operates as a continuous control servo-mechanism, and for error signals greater than this predetermined value it operates as a relay servo-mechanism. This is achieved by switching from using the error signal as the input signal to the servo-motor to using a constant voltage signal sufficient to drive the motor at its maximum speed. Thus, this system combines the advantages of both types of systems while eliminating the disadvantages of each by switching them into operation only in situations where their advantages will be emphasized.

It is also necessary to switch readily from one mode of operation to the other. While operating as a relay servo-mechanism, when the error decreases toward zero, the system returns to its continuous control mode of operation by switching back to using the output of the continuous servo controller as the input to the servo-motor. In switching from relay operation to continuous control, the rotational inertia of the system operating at its maximum speed presents a problem. This inertia must be overcome before the system can again act as a continuous control servo-mechanism. If it does not revert to a continuous control servo-mechanism when a large error signal approaches zero, it will overshoot and hunt the position of zero error, causing an undesired increase in the time of response.

To overcome this difficulty, a transient voltage of opposite polarity to the output of the continuous servo controller is used as a damping or retarding force after the switching operation to reduce this possiblity of overshoot or hunting the position of zero error.

The embodiment shown is useful in a positioning system of a land based radar system. However, the same principle may be used in other embodiments and in other fields such as telemetering or industrial control, and airborne radar systems.

The invention will be described in greater detail by reference to the accompanying drawing wherein the single figure is a schematic block circuit diagram of a preferred embodiment of the invention.

The radar positioning servo-system as shown in the drawing includes coupling (shown in dotted lines) to a source of error displacement 6, a continuous servo controller 1, outlined in dashed lines, and a relay servo controller 2, outlined in dashed lines, both responsive to input error displacements, a servo-motor control circuit 3, outlined in dashed lines, driven by the output of the two servo controllers 1, 2, and a servo-motor 4 driving the load 9 in response to the output of the servo-motor circuit 3. The load 9 may be the radar antenna.

The continuous servo controller 1 includes a first synchro-system comprising a synchro generator 10 and a synchro control transformer 11, an A.C. amplifier 12 driven by the output of the synchro control transformer 11, and a demodulator 13 operating on the output of the A.C. amplifier 12. The rotor of the synchro generator 10 is mechanically coupled to the servo-motor 4. The rotor of the synchro control transformer 11 is positioned by the error source 6. Any lack of positional correspondence between the error source 6 and the load 9 results in an output signal being produced at the rotor of the synchro transformer 11. This output signal corresponds in amplitude and phase to the lack of positional correspondence between the error source 6 and the load 9. The amplifier 12 may be of any standard electronic type. The demodulator 13 also may be of any standard electronic type, and for ground radar systems will be expected to demodulate a 60 cps. signal.

The relay servo controller 2 includes a second synchro system comprising a synchro generator 20 and a synchro control transformer 21 operating in the manner described above, a demodulator 29 operating on the output of the second synchro transformer 21, a switch circuit 22 driven by the demodulator 29, a relay whose coil 23 is actuated by the switch circuit 22 and whose movable contacts 24, 25 are interposed between the two servo controllers 1, 2 and the servo-motor circuit 3, and whose normally closed contacts connect to the output of the continuous servo controller 1, and whose normally open contacts connect to sources of constant positive voltage 27 and constant negative voltage 28, and also connect a storage capacitor 26 capable of being charged by the constant negative voltage source 28 and capable of discharging into the servo-motor circuit 3. The demodulator may be of any standard electronic type. The switch circuit 22 may be an electronic amplifier biased beyond its cut-off point. When the output of the demodulator 29 is sufficient to overcome this bias, the amplifier will put out a signal which energizes the relay coil 23. Thus, the amplifier operates as a switch. For a demodulated synchro transformer output less than the bias voltage, there is no output from the switch circuit 22. For a transformer output greater than the bias voltage, there is a switch circuit output.

The servo-motor circuit 3 includes D.C. amplifying means 31, a rate feedback mechanism 32, and a mixer circuit 33. The D.C. amplifying means 31 may be an electronic amplifier, or an amplidyne, or a combination of both in series. The mixing circuit 33 permits several voltage signals to be added together to form one signal dependent on all. It may be composed of a network of resistors. The output of the mixing circuit 33 feeds into the D.C. amplifying means 31. The rate feedback mechanism 32 is a tachometer generator. It is mechanically coupled to the servo-motor 4. Its output which is an electrical signal dependent on the rotational speed of the servo-motor 4 is fed into the mixer circuit 33. The purpose of such feedback, as understood in the art, is to provide smoother and faster response to error signals.

In the system as tested, two switch circuits 22 and two relays 23 were used, one switch circuit and relay for clockwise errors and the other switch circuit and relay for counterclockwise errors. The block diagram shows only one relay and switch circuit since both operate in a similar manner, though using opposite polarity errors for operation, and connect opposite polarity voltages to points 27 and 28 to account for the opposite directions of rotation.

An error displacement is fed into the synchro-control transformer 11 of the first synchro system which compares its angular position with that of the generator 10 of the first synchro system. The resulting output of the synchro transformer 11 due to the positioning error is amplified by the A.C. amplifier 12, made into a direct current signal by the demodulator 13, and, when the relay coil 23 is in its de-energized state, fed through the normally closed contacts of the relay into the servo-motor circuit 3 which drives the servo-motor 4. Thus, for small error signals, when the relay coil 23 is de-energized, the system operates as a normal linear servo-system.

The error displacement is also fed into the second synchro control transformer 21 which compares its angular position with that of the generator 20 of the second synchro system. The demodulated output of this synchro transformer 21 operates the switch circuit 22 which either does or does not apply a voltage to the relay coil 23. When the demodulator 29 output becomes larger than the bias voltage on the amplifier of the switch circuit 22, the switch circuit 22 operates, energizing the relay coil 23. This operates the relay movable contacts 24, 25 interposed between the servo controllers 1, 2 and the servo-motor circuit 3. One of these movable contacts 24 connects a source of constant positive slew voltage 27, capable of driving the servo-motor at top speed, to the servo-motor 4 through the servo-motor circuit 3.

The other movable contact 25 connects a source of negative precharge voltage 28 to the storage capacitor 26, charging the capacitor. The system continues to operate in this manner as long as the error displacement is of sufficient magnitude to cause the second synchro system 20, 21 and the switch circuit 22 to operate the relay coil 23.

When the error displacement decreases below this predetermined magnitude, the electronic amplifier is again biased beyond cut-off and the switch circuit 22 ceases to operate the relay coil 23, so the coil de-energizes. The relay movable contacts 24, 25 then return to their normal positions. The output of the continuous servo controller 1 is again connected to operate the servo-motor 4 through the servo-motor circuit 3. However, the servo-motor 4 and load 9 have built up a certain inertia due to their operation at maximum speed. This inertia must be overcome before the system again operates as a continuous-control servo-system. The negative precharge voltage which is present on the storage capacitor 26 is also fed into the mixer 33 of the servo-motor circuit 3. Thus, the servo-motor 4 is driven by a combination of the output of the continuous servo controller 1, the rate feedback from the tachometer generator 32, and the discharge of the storage capacitor 26. This latter voltage is of such polarity as to try to reverse the direction of rotation of the servo-motor 4, and of such magnitude as to balance the inertia of the motor 4 and load 9 without causing the actual reversal of rotation. Since it dies out transiently, the system can be made to return to continuous control operation rapidly.

Obviously many modifications and variations of the present invention are possible in the light of the above teachings. It is therefore to be understood that within the scope of the appended claims, the invention may be practiced otherwise than is specifically described.

What is claimed is:

1. A control servo-system for controlling a load including in combination, connections to a source of constant voltage, coupling to a source of error displacements, a continuous servo controller and a relay servo controller, both responsive to said error displacements, a servo-motor which drives the load, switching means for actuating said servo-motor by said continuous servo controller in response to error displacements less than a predetermined value, and switching means for actuating said servo-motor by said constant voltage source through said relay servo controller in response to error displacements greater than said predetermined value, said switching means disconnecting the output of said continuous servo controller as the input to said servo motor and connecting said constant voltage to drive said servo-motor at its maximum speed, where, while said servo-motor is being driven by said relay servo controller and when said error displacement decreases below a predetermined magnitude, said switching means returns said motor to being driven by said continuous servo controller by reconnecting said output of said continuous servo controller as the input to said servo-motor and disconnecting said constant voltage as said input.

2. A control servo-system for controlling a load including in combination, connections to a source of constant voltage, coupling to a source of error displacements, a continuous servo controller and a relay servo controller both responsive to said error displacements, a servo-motor which drives the load, switching means for actuating said servo-motor by said continuous servo controller in response to error displacements less than a predetermined value, switching means for actuating said servo-motor by said constant voltage source through said relay servo controller in response to error displacements greater than said predetermined value, said switching means disconnecting the output of said continuous servo controller as the input to said servo-motor and connecting said constant voltage to drive said servo-motor at its maximum tracking speed, where, while said servo-motor is being driven by said relay servo controller, and when said error displacement decreases below a predetermined magnitude, said switching means returns said motor to being driven by said continuous servo controller by reconnecting said output of said continuous servo controller as the input to said servo-motor and disconnecting said constant voltage as said input, and means to supply a transient voltage to said servo-motor, where said transient voltage from said supply means, being of opposite polarity to the output of said continuous servo controller provides a retarding force to counter the inertia of said motor after said reconnection of said continuous servo controller.

3. A control servo-system for controlling a load including in combination, coupling to a source of error displacement; a continuous servo controller comprising a first synchro system responsive to said error displacement, said synchro system comprising a synchro generator and a synchro transformer, an A.C. amplifier driven by the output of said synchro control transformer, and a demodulator driven by the output of said A.C. amplifier; a relay servo controller comprising a second synchro system responsive to said error displacement, said synchro system comprising a synchro generator and a synchro control transformer, a demodulator driven by the output of said synchro control transformer, a switch circuit driven by said demodulator and a relay whose coil is actuated by said switch circuit; a servo-motor circuit driven by the output of said servo controllers, where the moving contacts of said relay are interposed between said servo controllers and said servo-motor circuit; a servo-motor driving the load and driven by the output of said servo-motor circuit; a storage capacitor connected to discharge into said servo-motor circuit; and connections to sources of constant positive voltage and constant negative voltage; where said moving contacts of said relay in their normal positions are so connected that said error displacements drive said servo-motor through said servo-motor circuit and through said continuous servo controller when said error displacements are less than a predetermined value; and where said contacts, when said relay is activated, are so connected that said constant positive voltage drives said servo-motor at maximum speed through said relay servo controller when said error signals are greater than said predetermined value; and where, when said error displacements decrease from greater than said predetermined value to less than said value, and said relay servo controller is therefore de-energized, said storage capacitor supplies a transient voltage of opposite polarity to the output of said continuous servo controller to provide a retarding force to the inertia of said servo motor and said load.

References Cited in the file of this patent
UNITED STATES PATENTS

| | | |
|---|---|---|
| 2,399,695 | Satterlee | May 7, 1946 |
| 2,455,364 | Hays | Dec. 7, 1948 |
| 2,561,654 | Eller | July 24, 1951 |
| 2,583,552 | Edwards | Jan. 29, 1952 |
| 2,698,407 | Pease | Dec. 28, 1954 |